Figure 1:
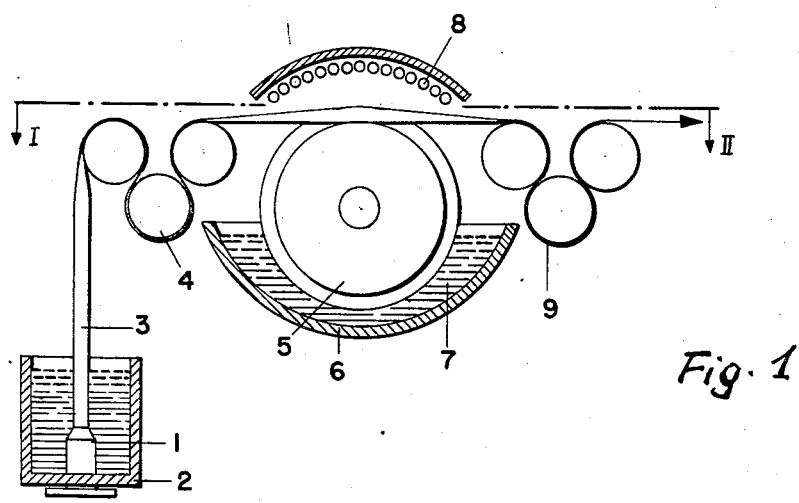

Feb. 23, 1960 B. PARTH 2,925,621
METHOD OF MAKING REGENERATED CELLULOSE SAUSAGE
CASINGS IN SPIRALLY COILED FORM
Filed Sept. 9, 1953 2 Sheets-Sheet 1

INVENTOR
BRUNO PARTH
BY Connolly and Hutz
HIS ATTORNEYS

Feb. 23, 1960 B. PARTH 2,925,621
METHOD OF MAKING REGENERATED CELLULOSE SAUSAGE
CASINGS IN SPIRALLY COILED FORM
Filed Sept. 9, 1953 2 Sheets-Sheet 2

INVENTOR
BRUNO PARTH
BY
*Connolly and Hutz*
HIS ATTORNEYS

2,925,621

METHOD OF MAKING REGENERATED CELLULOSE SAUSAGE CASINGS IN SPIRALLY COILED FORM

Bruno Parth, Wiesbaden-Biebrich, Germany, assignor to Kalle & Co. Aktiengesellschaft, Wiesbaden-Biebrich, Germany Application September 9, 1953, Serial No. 379,270

Claims priority, application Germany October 13, 1953

2 Claims. (Cl. 18—57)

The present invention relates to the manufacture of artificial sausage casings of regenerated cellulose. More particularly it relates to the manufacture of such sausage casings in spirally coiled form.

It is well known that artificial sausage casings of regenerated cellulose have been manufactured for a long time. Some kinds of sausage being customarily put in the market in the well-known rounded annular shape for which casings of a special kind are required and to which tradespeople and craftsmen stick for practical and traditional reasons, producers of artificial sausage casings have to contend with the problem of manufacturing their products in said annular shape.

Artificial annular sausage casings have been manufactured, for instance, as follows:

The regenerated cellulose casings manufactured in known manner are inflated with air when in wet gel-condition, and coiled around a heated cylinder. As a result, one side of the coiled casing, i.e. the one in touch with the hot surface of the cylinder, shrinks, which causes a certain stability of the spiral shape. Subsequently, drying of the spirally shaped casing is completed in a tunnel oven. Thus, spirally coiled sausage casings are obtained which have proved quite useful for the manufacture of annular rounded sausages. Nevertheless, some deficiencies are still inherent in these sausage casings. Their annular shape is not in all instances preserved as much as desirable. Especially, if the casing is filled with a sausage mass of high humidity, the annular shaped tube may have a tendency to stretch to a certain degree.

Now it has been found that the above indicated deficiencies in annular sausage casings of regenerated cellulose are avoided and that tubes of stabilized annular shape are obtained as follows:

The viscose solution is extruded through a ring-shaped extrusion nozzle into a spinning bath which exerts a coagulating action, and after having the necessary degree of stability, the coagulated tube thus obtained is inflated with air or an inert gas and, while still inflated, coiled around a cylinder in one or more spiral turns. Subsequently, the coagulated viscose is converted into regenerated cellulose. Finally, the tube of regenerated cellulose is subjected to the usual cleaning, after-treatment and drying procedure.

Figure 2:
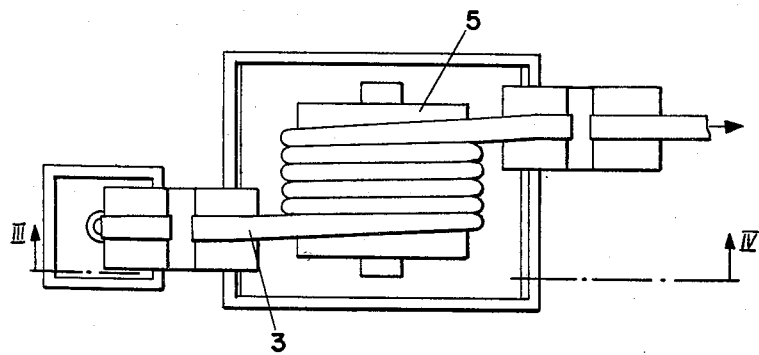

The accompanying drawings serve for better interpretation of the method according to the present invention and of apparatus used therein. Fig. 1 schematically shows an apparatus adapted for performing the method of the invention in vertical section taken approximately on the line III—IV of Fig. 2. Fig. 2 shows a top view of the apparatus shown in Fig. 1 in section taken approximately on the line I—II of Fig. 1.

Figure 4:
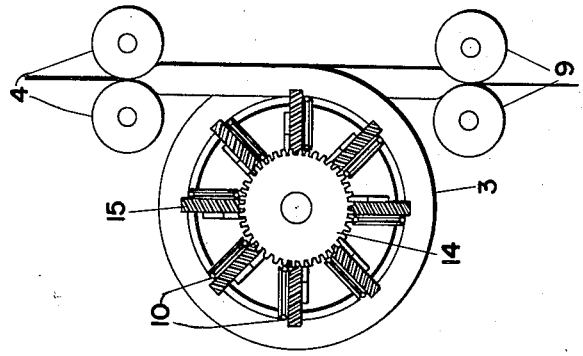
Figure 3:
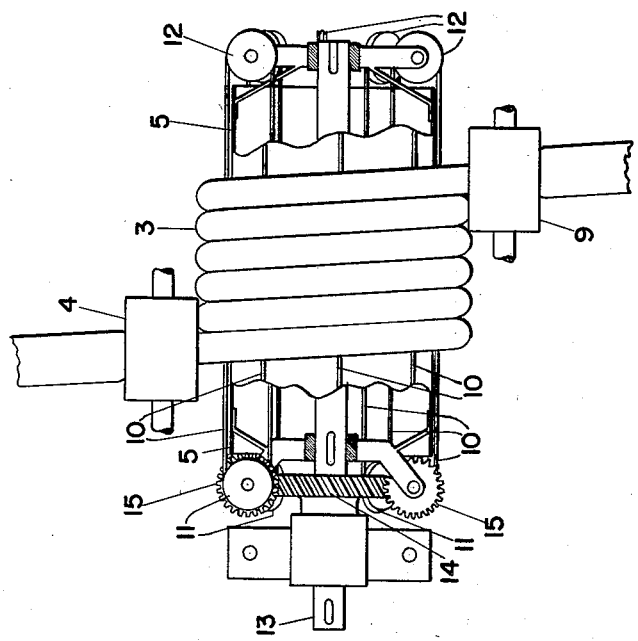

Figs. 3 and 4 illustrate a device for continuously coiling an inflated tube, Fig. 3 being a front elevation, some parts of the device being cut, some being broken away for better inspection of the interior of the device, Fig. 4 being a side elevation.

In the process according to the present invention the sausage casing is spirally formed while still in the stage of coagulation. In this stage, the walls of the tube consist wholly or partially of hydrated cellulose xanthogenate which is not yet transformed into regenerated cellulose. The tube walls are, therefore, very plastic and may be shaped far more easily than after transformation into regenerated cellulose. Therefore, coagulation of the extruded viscose solution is effected under certain suitable conditions. The temperature of the spinning bath and the time the extruded mass stays in the spinning bath are of importance. Advantageously, such spinning baths are used which act exclusively or predominantly as a coagulating agent upon the viscose solution.

Such baths acting on the extruded viscose solution as coagulating agents are, for instance, weekly acid baths, advantageously containing much ammonium sulfate and, in a given case, also sodium sulfate (Glauber's salt). By means of such baths, a coagulated tube of high plasticity is obtained which is highly swollen and consists mainly of cellulose xanthogenate.

The shaping of the coagulated, not yet regenerated plastic tube into a spiral by inflating with air or gas and then coiling around a cylinder may be effected either discontinuously or continuously. In the latter case it is advantageous to use a cylinder whose cylindrical surface is composed of elements which, while the cylinder turns around its axis, move in a direction parallel to the axis of the cylinder at a speed such as to make possible the continuous coiling of the inflated tube around the cylindrical surface in spiral turns. For instance, referring to Figs. 3 and 4 the cylinder 5 may be combined with a plurality of endless ropes 10, each of which first runs externally parallel to the axis of the cylinder 5, then is deflected around one of the pulleys 12 which are fastened at one end of the cylinder and thereby is guided back through the interior of the cylinder to reach one of the pulleys 11 at the other end of the cylinder. The rope loops around this pulley to return to the external surface. The pulleys are driven so that as the cylinder turns around its axis, the ropes are all moved together in one direction. An inflated tube being wound around the ropes as the cylinder rotates is accordingly transported by the ropes in the same direction the external runs of the ropes move, so that the inflated tube is coiled continuously around the cylinder in spiral turns, the tube always reaching the moving ropes at the same location. Regeneration of the spirally shaped inflated tube may be effected, for instance, by simultaneously immersing the lower part of the cylinder to a regeneration bath. Alternatively the spirally shaped inflated tube may be regenerated by acting upon it with infra-red light waves produced by an infra-red radiator, or the two regeneration methods just mentioned as examples may be combined with each other.

After having suffered regeneration in spirally shaped state, the tube is subjected to the usual washing procedures. For this reason, the tube, which is deflated and therefore in flat state, is passed in, through and out of the various baths necessary for the treatment by the aid of conveyor rollers, as is the case with non-shaped tubes. Thereafter, the tube is dried as usual. Previous to drying, however, the tube, after inflating it again with air which brings the tube into spiral form, is advantageously impregnated in known manner with a softening agent, such as glycerine. After drying, the tube may be coiled on a spool in flat state.

The process according to the present invention is suited for the manufacture of spirally coiled regenerated cellulose sausage casings of highly improved stability of shape. The diameter of the single coils is conveniently reduced.

The following examples are included in order to illustrate the new process by different ways of carrying it out. It is to be understood that it is not intended to limit the scope of the present invention to the embodiments described in the examples, but that the invention is capable of many modifications. Changes, therefore, in the arrangement may be made without departing from the spirit and scope of the present invention. Figures 1 and 2 serve to illustrate the following Examples 1 and 2.

EXAMPLES

Example 1

A viscose solution is extended through a ring-shaped extrusion nozzle 1 into a bath 2 which is adjusted to exert a coagulating, not regenerating action upon the viscose. The coagulated tube then passes the driven rollers 4 which effect an even transportation and air-tight pinching of the tube. After passing the rollers 4, the tube is inflated by air or an inert gas which at the beginning of the production had been introduced into the tube and remains in that part of the tube which, at the respective stage of production, is limited by the two pinching points 4 and 9. The tube thus inflated with air or gas is laid from above onto a horizontal cylinder with endless rope conveyor 5 as described above, and coiled around the cylinder 5 in several turns. Then it passes the driven rollers 9, which serve for transportation and pinching the same as the rollers 4. The lower part of the horizontal cylinder 5 is immersed in a tank 6 which contains the regeneration bath 7. Thus the tube revolving with the cylinder 5 is immersed several times into the bath 7, which causes the walls of the coiled-up tube to be transformed into cellulose hydrate. Figure 2 shows the coils of the tube 3 lying spirally around the cylinder 5 while being immersed into the regeneration fluid. After leaving the cylinder 5 the tube, which now consists of regenerated cellulose hydrate and is permanently spirally shaped, first passes the second pinching point 9 and is then led through the desulfurizing, washing and softening baths customary in the manufacture of cellulose hydrate casings.

Example 2

As in Example 1, the inflated coagulated tube is wound around a cylinder provided with a plurality of endless movable ropes which move over the working surface of the cylinder in a direction parallel to the axis of the cylinder. The cylinder, however, is not immersed in a regenerating bath, but parts of the spirally coiled inflated tube lying on it are exposed to the radiation of infra-red radiators 8. Further treatment of the tube is the same as described in Example 1.

Example 3

A solution of viscose is extruded through a ring-shaped extrusion nozzle into a bath which causes the tube precipitating from the viscose solution to coagulate only to such a degree as to withstand the following treatment. In flat state, the coagulated tube is wound around spools in pieces of about 100 m. each. Pieces of tube of about 10 m. length are taken from the spool and are first closed on one side, then inflated with air, and finally closed on the other side. The pieces of tube thus inflated with air are spirally coiled around a heated cylinder. The cylinder provided with the coiled-up tube is then led through a heating channel and—after cooling—successively through regeneration, desulfurizing, washing and softening baths. The passage of the coiled tube through the regenerating bath is not necessary if the prior application of heat has been sufficient to cause satisfactory regeneration. The transport through the heating channel, cooling zone and the different baths is effected by means of an endless chain from which the cylinder is suspended.

The method described above may be modified by using a cylinder which is not previously heated for coiling the inflated pieces of tube, and/or by omitting treatment in the heating channel.

Having thus described the present invention what I claim is:

1. A method of making regenerated cellulose sausage casings having a stable spiral shape, which comprises extruding a viscose solution through a ring shaped extrusion nozzle into a spinning bath, said spinning bath consisting essentially of a coagulating agent for the viscose solution to form a coagulated tube, inserting a gas of the group consisting of air and an inert gas into the coagulated tube, winding said gas-filled tube, while still substantially unregenerated, onto the peripheral surface of a rotating cylindrical holder, said peripheral surface moving with respect to the tube in a direction substantially parallel to the rotational axis of the holder as it rotates, to effect a spiral winding of said tube on said holder, subjecting said tube while so wound to a regenerating action and after the regeneration is completed and the tube has taken a permanent set in the spiral shape, removing the tube from the holder.

2. A method of making regenerated cellulose sausage casings having a stable spirally coiled shape, said method being characterized by the steps of extruding a viscose solution through a ring-shaped nozzle into a spinning bath so as to effect only a coagulating action on the viscose to form a substantially unregenerated but coagulated viscose tube, inflating the tube with an essentially inert gas, then while the inflated tube is still substantially unregenerated winding it into a spiral coil around the peripheral surface of a cylindrical holder that rotates around its cylindrical axis with respect to the tube and also moves axially with respect to the tube as the winding is effected, completely regenerating the coagulated viscose of the tube while it is so wound, to cause the tube to become permanently set into spirally coiled form, then cleaning and finishing the tube.

References Cited in the file of this patent

UNITED STATES PATENTS

| | | |
|---|---|---|
| 1,423,349 | McClenathen | July 18, 1922 |
| 1,997,349 | Schwalbe et al. | Apr. 9, 1935 |
| 2,010,207 | Toppann et al. | Aug. 6, 1935 |
| 2,070,247 | Weingand et al. | Feb. 9, 1937 |
| 2,136,566 | Schnecko et al. | Nov. 15, 1938 |
| 2,143,627 | Knowland | Jan. 10, 1939 |
| 2,176,925 | Reichel et al. | Oct. 24, 1939 |
| 2,200,735 | Battin | May 14, 1940 |
| 2,346,187 | Reichel | Apr. 11, 1944 |

FOREIGN PATENTS

| | | |
|---|---|---|
| 471,566 | Great Britain | Sept. 7, 1937 |